(12) United States Patent
Plummer et al.

(10) Patent No.: US 8,488,304 B2
(45) Date of Patent: Jul. 16, 2013

(54) NETWORKING CONNECTION SYSTEMS AND RELATED METHODS

(75) Inventors: Jon R. Plummer, Los Angeles, CA (US); Matthew P. Glidden, Simi Valley, CA (US)

(73) Assignee: Blekin International, Inc., Playa Vista, CA (US)

( * ) Notice: Subject to any disclaimer, the term of this patent is extended or adjusted under 35 U.S.C. 154(b) by 172 days.

(21) Appl. No.: 12/845,699

(22) Filed: Jul. 28, 2010

(65) Prior Publication Data

US 2011/0026205 A1 Feb. 3, 2011

Related U.S. Application Data

(60) Provisional application No. 61/229,263, filed on Jul. 28, 2009.

(51) Int. Cl.
*G06F 1/16* (2006.01)
(52) U.S. Cl.
USPC ......... 361/679.01; 257/59; 345/501; 361/104
(58) Field of Classification Search
USPC .............. 257/40, 43, 59; 361/679.01, 679.26, 361/679.03, 679.02, 679.55; 345/207, 214, 345/173, 212, 589, 501; 362/97.01, 294.4, 362/103, 104; 307/10.2
See application file for complete search history.

(56) References Cited

U.S. PATENT DOCUMENTS

| 3,848,224 A | 11/1974 | Olivero |
| 6,683,390 B2 * | 1/2004 | Miura ......................... 307/10.2 |
| 8,023,262 B2 * | 9/2011 | Ligtenberg et al. ...... 361/679.55 |

OTHER PUBLICATIONS

King, Greg. D-Link Xtreme N DIR-655 Wireless Router, TechGage, May 23, 2007. <http://techgage.com/print/d-link_xtreme_n_dir-655_wireless_router>. (15 pages).
PCT International Search Report for application No. PCT/US10/43601, Sep. 23, 2010.

* cited by examiner

*Primary Examiner* — Hung Duong
(74) *Attorney, Agent, or Firm* — Bryan Cave LLP (57) ABSTRACT

In one embodiment, a connection system for an electronic device comprises an enclosure comprising sides, and an interior encompassed by the sides. The interior can comprise (1) an electronic device area configured to house the electronic device, (2) a first accessory area configured to house a first accessory of the electronic device (3) a second accessory area configured to house a second accessory of the electronic device and/or (4) one or more walls separating from each other at least two of the electronic device area, the first accessory area, or the second accessory area. When the electronic device is housed in the electronic device area, the first accessory is housed in the first accessory area, and the second accessory is housed in the second accessory area the one or more walls are configured to permit the first and second accessories to be connected to the electronic device. Other examples and related methods are described herein.

33 Claims, 7 Drawing Sheets

NETWORKING CONNECTION SYSTEMS AND RELATED METHODS

CROSS-REFERENCE TO RELATED APPLICATION

This patent application claims priority to U.S. Provisional Patent Application No. 61/229,263 titled Router Connection System, and filed on Jul. 28, 2009. The disclosure of the referenced application is incorporated herein by reference.

TECHNICAL FIELD

This disclosure relates generally to connection systems, and relates more particularly to networking connection systems and related methods.

BACKGROUND

To the uninitiated, the process of setting up and/or of configuring electronic devices for use in a networked environment with other devices can be a daunting prospect. Even for users with more experience, it may not be readily apparent how and/or in what sequence to couple accessories to, and/or load software for, such electronic devices during the setup process. Accordingly, a need exists for networking connection systems capable of guiding users through such setup processes.

BRIEF DESCRIPTION OF THE DRAWINGS

The invention will be better understood from a reading of the following detailed description of examples of embodiments, taken in conjunction with the accompanying figures.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein.

The terms "couple," "coupled," "couples," "coupling," and the like should be broadly understood and refer to connecting two or more elements or signals, mechanically or otherwise. Two or more mechanical elements may be mechanically coupled, but not otherwise coupled. Coupling (whether mechanical or otherwise) may be for any length of time, e.g., permanent or semi-permanent or only for an instant. "Mechanical coupling" and the like should be broadly understood and include mechanical coupling of all types. The absence of the word "removably," "removable," and the like near the word "coupled," and the like does not mean that the coupling, etc. in question is or is not removable.

DESCRIPTION

In one embodiment, a connection system for an electronic device comprises an enclosure comprising sides, and an interior encompassed by the sides. The interior can comprise (1) an electronic device area configured to house the electronic device, (2) a first accessory area configured to house a first accessory of the electronic device (3) a second accessory area configured to house a second accessory of the electronic device and/or (4) one or more walls separating from each other at least two of the electronic device area, the first accessory area, or the second accessory area. When the electronic device is housed in the electronic device area, the first accessory is housed in the first accessory area, and the second accessory is housed in the second accessory area the one or more walls are configured to permit the first and second accessories to be connected to the electronic device.

In one embodiment, method for providing a connection system for an electronic device comprises: providing an enclosure comprising sides, providing an interior of the enclosure encompassed by the sides, providing an electronic device area at the interior of the enclosure to house the electronic device, providing a first accessory area at the interior of the enclosure to house a first accessory of the electronic device, providing a second accessory area at the interior of the enclosure to house a second accessory of the electronic device, and/or providing walls at the interior of the enclosure to (1) separate from each other at least two of the electronic device area, the first accessory area, or the second accessory area and (2) permit the first and second accessories to be connected to the electronic device through a least one of the walls.

In one embodiment, a connection system for a router comprises an enclosure comprising sides, an interior of the enclosure, and a sequential instruction set. The interior of the enclosure is encompassed by the sides, and comprises (1) a router area configured to house and substantially conform to a contour of the router, (2) a power cord area configured to house a power cord for the router, (3) a network cable area configured to house a network cable for the router, and (4) one or more walls separating from each other at least two of the router area, the power cord area, or the network cable area. The sequential instruction set can be configured to provide instructions for setting up the electronic device. The one or more walls comprise a first passageway between the router area and the power cord area, and a second passageway between the router area and the network cable area. When the router is housed in the router area, the power cord is housed in the power cord area, and the network cable is housed in the network cable area, (1) the first passageway is aligned with a power connector of the router, (2) the second passageway is aligned with a network connector of the router, (3) a first connector of the power cord is connected to the power connector of the router via the first passageway, and (4) a first connector of the network cable is connected to the network connector of the router via the second passageway. The sequential instruction set comprises (1) a first instruction bar coupled to the power cord and comprising a first language neutral instruction comprising an indication to couple a second connector of the power cord to a power source, and a first sequence marker, (2) a second instruction bar coupled to the network cable and comprising a second language neutral instruction comprising an indication to couple a second connector of the network cable a network source, and a second sequence marker, (3) a third instruction bar within the interior of the enclosure and comprising a third language neutral instruction comprising an indication to load onto a computing device an application for configuring networking parameters with respect to the router, and a third sequence marker, and (4) a setup card coupled to the router and comprising at least one of a network ID of the electronic device, or a password for the electronic device. The first, second, and third sequence markers can denote a sequence for performing the first, second, and third language neutral instructions relative to each other.

Figure 1:
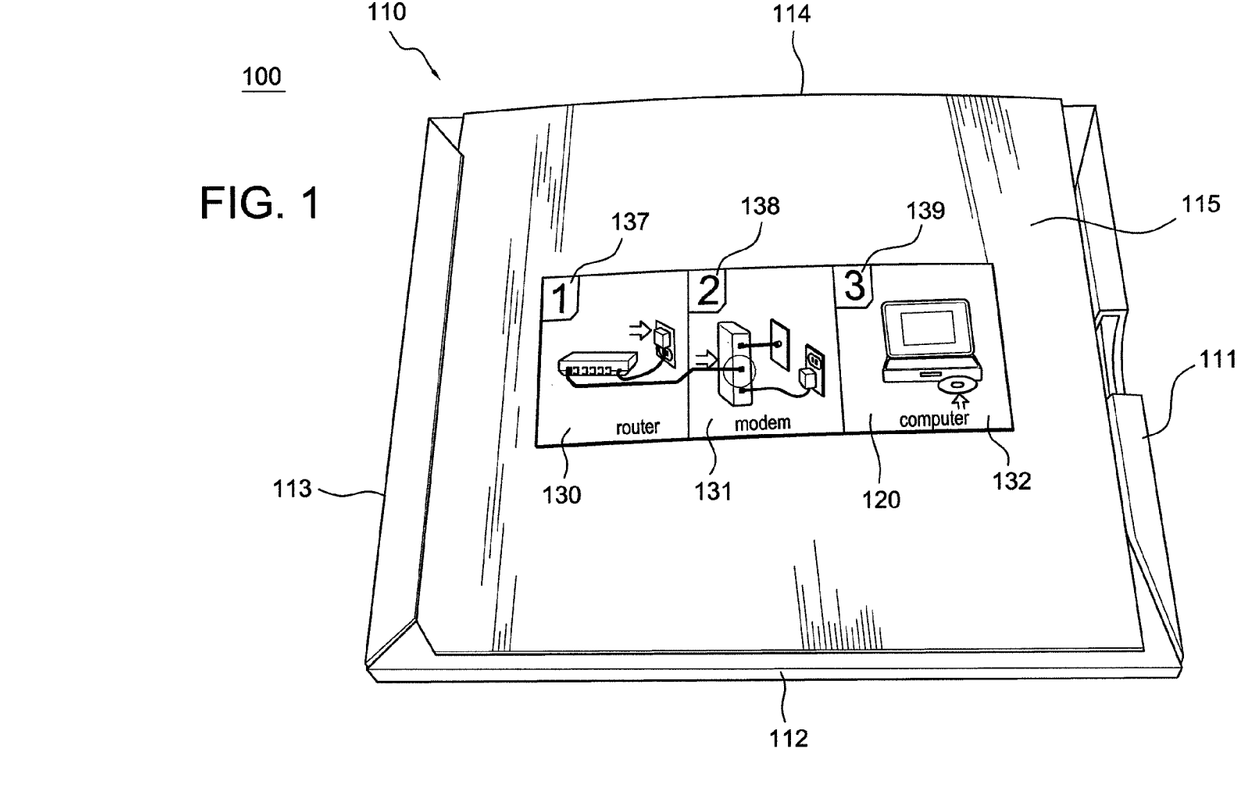
FIG. 1 presents an embodiment of an exterior of an enclosure of an exemplary connection system for providing an enhanced user experience when physically configuring an electronic device for a network.

Referring now to the figures, FIG. 1 presents an exterior of enclosure 110 of exemplary connection system 100 for providing an enhanced user experience when physically configuring an electronic device for a network, according to an embodiment. Connection system 100 includes enclosure 110 having right side 111, front side 112, left side 113, rear side 114, top flap 115, and a bottom side (not shown). In the present example, top flap 115 is coupled to, and configured to hinge about, a top edge of left side 113. There can be other embodiments where top flap 115 couples to or hinges about a top end of another side of enclosure 110. Connection system 100 additionally includes instruction bar 120. In some embodiments, enclosure 110 and its associated elements 111-115 are manufactured as a single piece and are folded to form each element. In other embodiments, the functionality of elements 111-115 is performed by separate elements coupled to one another. Enclosure 110 can be manufactured from any suitable material including cardboard, corrugated cardboard, various types of polymers, thermoplastics, wood, metal and the like. As described above, such embodiments may be manufactured as a single piece that is folded to form an enclosure or as several pieces affixed to one another to form an enclosure. Instruction bar 120 includes language neutral pictures or drawings demonstrating or otherwise showing a suggested way to physically configure the electronic device contained within enclosure 110. Details of instruction bar 120 are presented below.

Figure 2:
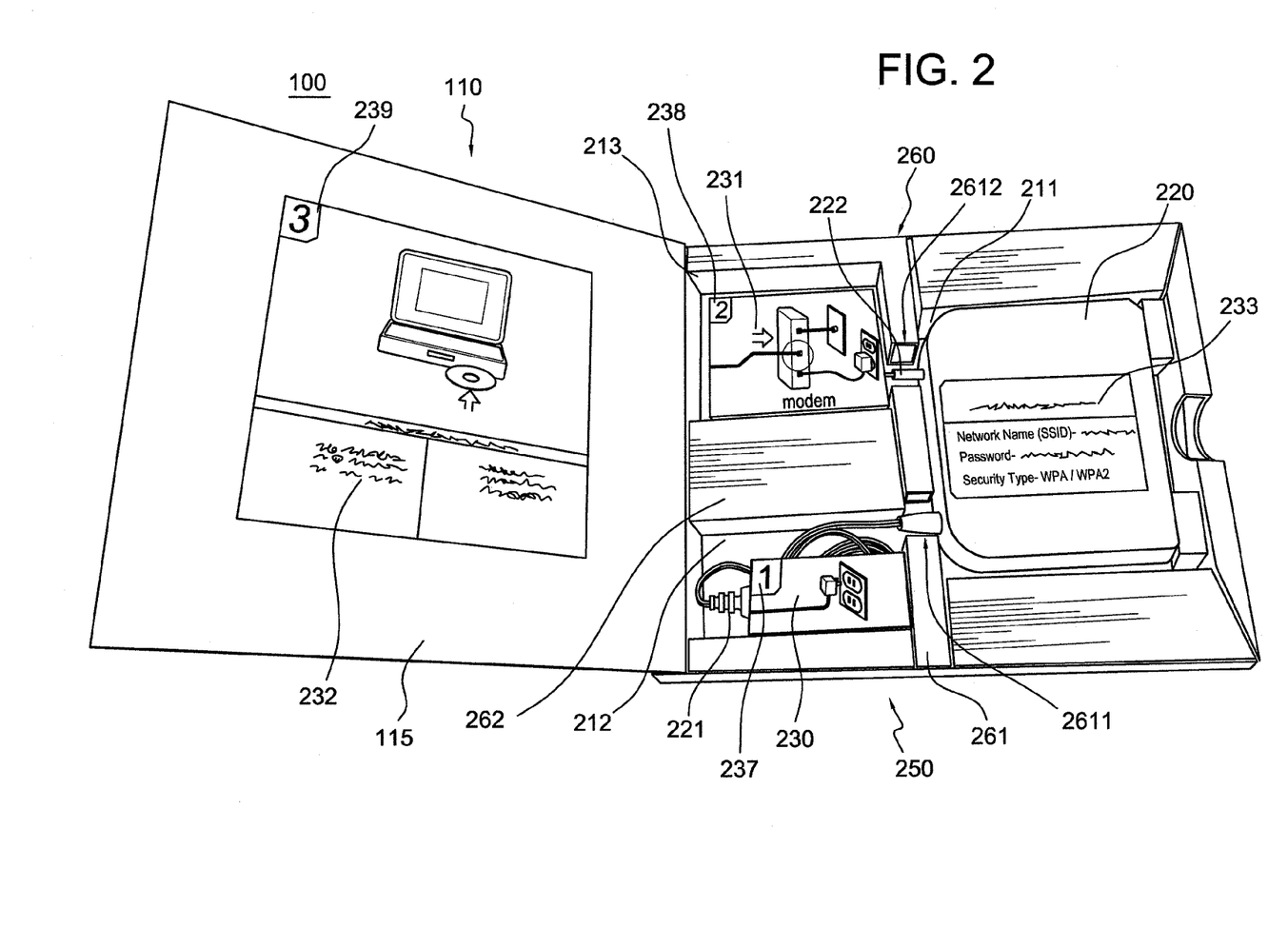
FIG. 2 presents an interior of the enclosure of FIG. 1

FIG. 2 presents interior 250 of enclosure 110 of connection system 100. In the present example, enclosure 110 comprises electronic device area 211, power cord area 212, and network cable area 213. In operation, each of areas 211, 212, and 213 is configured to receive an associated component. For example, electronic device area 211 is configured to house electronic device 220; power cord area 212 is configured to house power cord 221; and networking cable area 213 is configured to house networking cable 222. In some embodiments, and as illustrated in FIG. 2, each area within enclosure 110 is partitioned from other areas via walls 260 within enclosure 110. For example, wall 261 separates electronic device area 211 from networking cable area 213 and power cord area 212. In addition, wall 262 separates networking cable area 213 and power cord area 212 from each other. In some examples, one or more of walls 260 can be integral with one or more sides of enclosure 110. In other embodiments, walls 260 may be non-integral with the rest of enclosure 110, and may be positioned between the internal areas (e.g., areas 211-213) thereby forming the internal areas. In other embodiments, enclosure 110 does not include any delineated areas, but instead, each component (e.g., 220-222) is affixed to the interior of enclosure 110, such as by an adhesive, wire, or man-made or natural material ties, staples, or other fasteners, and the like. In the present example, walls 260 combine with the sides of enclosure 110 to delineate electronic device area 211 such as to substantially conform to a contour of the body of electronic device 220. There can be other examples where electronic device area houses electronic device 220 more loosely, and/or where areas 212-213 may similarly substantially conform to a contour of the components that they respectively house.

Electronic device 220 can be a special-purpose firmware device that is configured to be coupled to and be in communication with one or more computing devices on a local area network (LAN). Although electronic device 220 is depicted as a router in FIG. 2, there can be other embodiments where electronic device 220 could comprise other types or electronic or networking devices such as, for example, a network switch, hub, or modem. Electronic device 220 includes a connector configured to couple to power cord 221 and networking cable 222.

Power cord 221 can be any typical routing device power cord such as, for example, an alternating current-to-alternating current (AC-AC) power cord, alternating current-to-direct current (AC-DC) power cord, a direct current-to-direct current (DC-DC) power cord, and the like. Power cord 221 includes a first end capable of being removably and mechanically coupled to and in electrical communication with an associated power connector located on electronic device 220. In one embodiment, the first end of power cord 221 is pre-coupled to the associated power connector on electronic device 220 so that the user does not have to perform the coupling. Power cord 221 additionally includes a second end configured to mechanically couple to and be in electrical communication with a power source such as, for example, an AC wall outlet, a DC power source, and the like. In an example, the second end of power cord 221 includes a multi-pronged head to interface with a wall power outlet.

Networking cable 222 can be any typical networking system data cable, such as, for example, a category 5 cable (Cat5) including an Ethernet cable utilizing the IEEE 802.3 standard, Cat5e cabling, and the like. Cat 5 and Cat5e cabling is widely available, is known in the art, and will not be discussed further. Networking cable 222 includes a first end capable of being removably and mechanically coupled to and in electrical communication with an associated data connector located on electronic device 220. In one embodiment, the first end of networking cable 222 is pre-coupled to the associated data connector on electronic device 220 so that the user does not have to perform the coupling. Networking cable 222 additionally includes a second end configured to mechanically couple to and be in electrical communication with an associated data connector on a modem or other electronic or networking device.

There can be examples where power cord 221 and/or networking cable 222 can be referred to as accessories for electronic device 220. There also can be examples comprising further or different accessories for networking device 220, and/or and related accessory areas with respect to electronic device area 211.

In the present example, walls 260 are configured to permit power cord 221 and networking cable 222 to be coupled to electronic device 220 when all are housed within interior 250 of enclosure 110. For example, wall 260 comprises passageway 2611 between electronic device area 211 and power cord area 212, where passageway 2611 is configured to align with a power connector of electronic device 220 when electronic device 220 is housed in electronic device area 211. Passageway 2611 can permit passage of a connector of power cord 221 for connection with the power connector of electronic device 220. In addition, the present example shows wall 260 comprising passageway 2612 between electronic device area 211 and networking cable area 213, where passageway 2612 is configured to align with a network connector of electronic device 220 when electronic device 220 is housed in electronic device area 211. Passageway 2612 can permit passage of a connector of network cable 222 for connection with the network connector of electronic device 220. There can be other examples where passageways similar to passageways 2611-2612 may be located in more than one wall. There also may be examples where passageways can be configured to permit coupling of other types of accessories to other types of connectors of a networking or other electronic device.

Enclosure 110 additionally includes power cord instruction bar 230, networking cable instruction bar 231, enclosure instruction bar 232, and setup card 233. Power cord instruction bar 230 can be a language neutral user instruction set communicating to a user the concept of plugging the second end of power cord 221 into an appropriate power source. Networking cable instruction bar 231 can be a language neutral user instruction set communicating to a user the concept of plugging the second end of networking cable 222 into a network source, such as into a connector of a modem. Additionally, networking cable instruction bar 231 can include various additional instructions such as, for example, detailing to a user the need to connect the modem to a power source, as well as the need to connect the modem to a data signal source such as, for example, a telephone line wall jack, a cable outlet wall jack, and the like.

Enclosure 110 also comprises instruction bar 232 in the present example, where instruction bar 232 can comprise a language neutral instruction set communicating to a user the concept of loading an application, such as a software program to configure networking parameters for electronic device 220, onto the user's computing device. The software program may serve to configure electronic device 220 and/or the user's computing device to couple to a common network. In the present example, instruction bar 232 indicates to load the application by inserting one or more associated compact disks (CDs) or Digital Versatile Discs (DVDs) into the user's computing device. The one or more CDs or DVDs also can be contained within enclosure 110. In different embodiments, the one or more CDs or DVDs can be located within one or more CD or DVD areas (not shown in FIG. 2), within one or more pockets within enclosure 110 (not shown in FIG. 2), behind enclosure instruction bar 232, or the like.

Although in the present embodiment, instruction bar 232 is located at an inner surface of top flap 115, there can be embodiments where instruction bar 232 can be located elsewhere within interior 250 of enclosure 110. In one example, instruction bar 232 can be located at electronic device area 211, such as beneath electronic device 220.

In the present example, enclosure 110 also contains setup card 233, which can be an information card that includes a manufacturer-assigned network identification (ID), such as a service set ID (SSID), and/or password information for electronic device 220. Setup card 233 can be removably attached to electronic device 220 and can be configured to be removed by a user during the installation process and transported to the location of the user's computing device to assist the user in configuring the networking system. After completing the configuration of the networking system, the user can re-affix setup card 233 to electronic device 220 when adding one or more computing devices to the networking system.

In the present example, instruction bars 230-232 form a sequenced instruction set, being sequential relative to each other, and comprise respective sequence markers 237-239. In the present example, sequence markers 237-239 denote a sequence for performing the instructions of instruction bars 230-232 relative to each other. Although sequence markers 237-239 are numerical in the present example, there can be other examples where sequence markers 237-239 cam be otherwise organized, such as alphabetically.

Backtracking to FIG. 1, in the present example, instruction bar 120 is located at an exterior surface of enclosure 110, and comprises language neutral instructions 130-132 and corresponding sequence markers 137-139. Instruction bar 120 can serve as a summary or quick reference of the instructions contained in interior 250 (FIG. 2) of enclosure 110 for ease of reference, such that language neutral instructions 130-132 respectively summarize the language neutral instructions in instruction bars 230-232 (FIG. 2), and sequence markers 137-139 correspond respectively to sequence markers 237-239 (FIG. 2).

Figure 3:
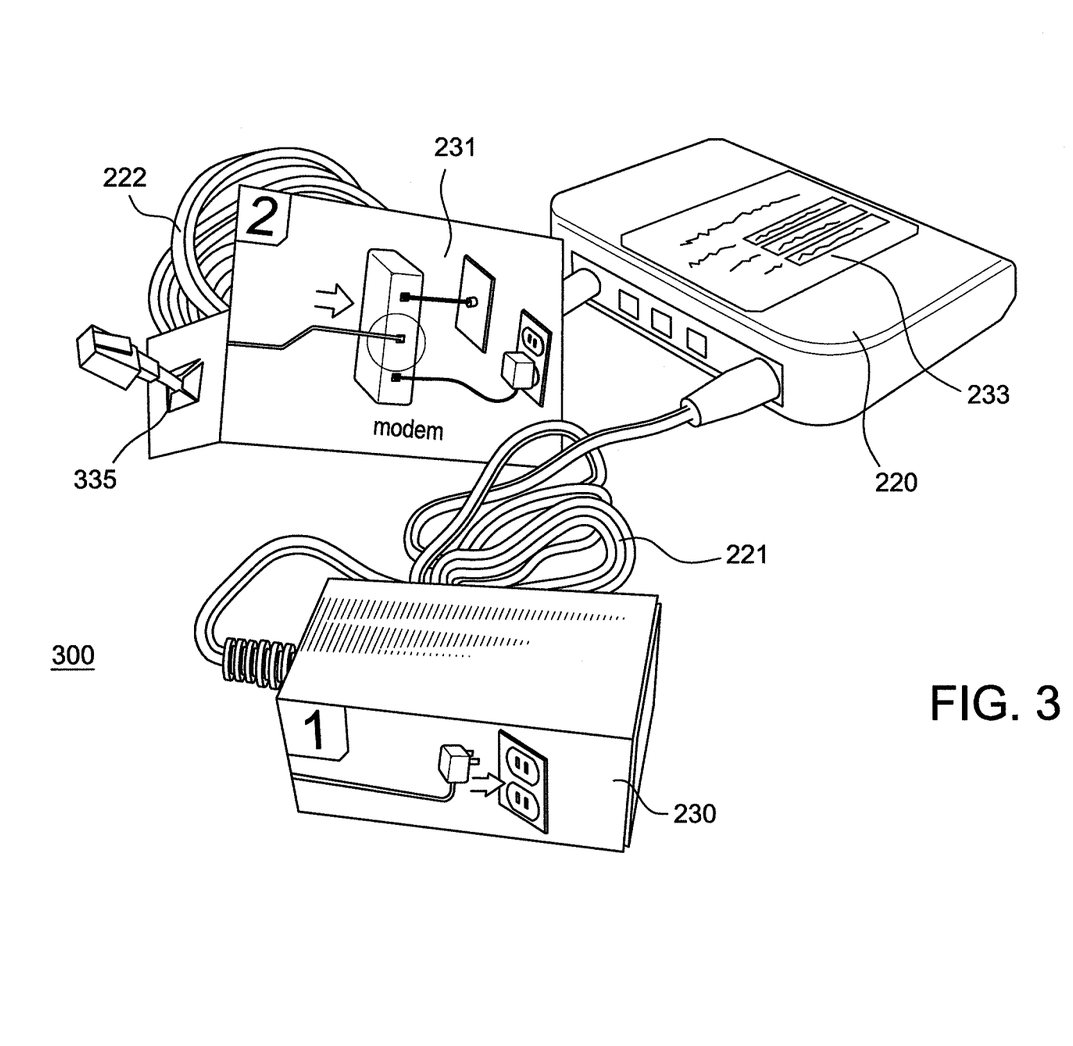
FIG. 3 illustrates a view of components presented in FIG. 2, but removed from the enclosure.

Moving on, FIG. 3 illustrates view 300 of the components presented in FIG. 2, but removed from enclosure 110. In FIG. 3, electronic device 220 is positioned so as to detail the mechanical coupling of the first end of power cord 221 to an associated power connector located on electronic device 220. Additionally, electronic device 220 is positioned so as to detail the mechanical coupling of the first end of networking cable 222 to an associated data connector located on electronic device 220. Although power cord instruction bar 230 is illustrated in FIGS. 2 and 3 as being affixed to a portion of power cord 221, power cord instruction bar 230 may be affixed to power cord 221 in various other ways such as, for example, via a sleeve or bag substantially enclosing power cord 221, via a sleeve partially enclosing power cord 221 (e.g., substantially similarly to partial sleeve 335 around portions of networking cable 222 to which networking cable instruction bar 231 is affixed), and the like. Similarly, although networking cable instruction bar 231 is illustrated in FIGS. 2 and 3 as comprising sleeve 335 partially enclosing networking cable 222, networking cable instruction bar 231 may be affixed to networking cable 222 in various other ways such as, for example, via a sleeve or bag fully enclosing networking cable 222, being affixed directly to networking cable 222 using an adhesive, and the like.

Figure 4:
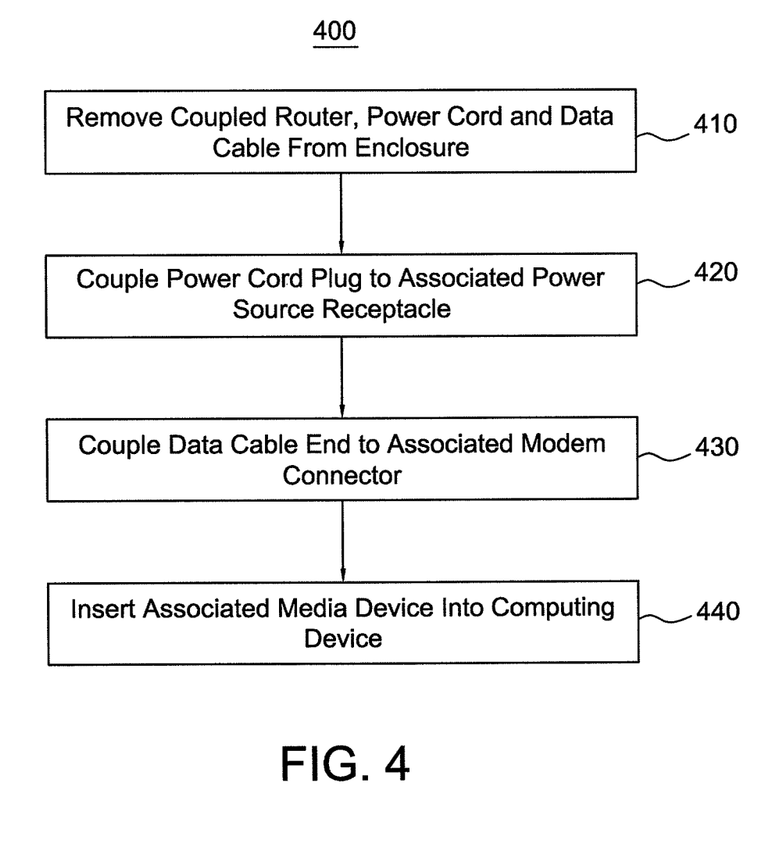
FIG. 4 is an operational flow diagram generally illustrating an embodiment of a method for enhancing a user experience when physically configuring a networking system.

FIG. 4 is an operational flow diagram generally illustrating an embodiment of a method 400 for enhancing a user experience when physically configuring a networking system. In one embodiment, method 400 is implemented with components of FIGS. 1-3, above. In some implementations, certain steps of method 400 are combined, performed simultaneously, or performed in a different order, without deviating from the objective of method 400.

Method 400 begins at step 410 where a user removes the components of the networking system from an associated networking system enclosure. In some embodiments, portions of the networking system are mechanically coupled to and in electrical communication with one another. In such embodiments, the electronic device, power cord, and networking cable are removed together. In an example and referring to FIGS. 2 and 3 above, the first end of power cord 221 is mechanically coupled to and in electrical communication with an associated power connector located on electronic device 220 when removed from enclosure 110, and the first end of networking cable 222 is mechanically coupled to and in electrical communication with an associated data connector located on electronic device 220 when removed from enclosure 110.

Returning to FIG. 4, at step 420, the user reads the instructions on the power cord instruction bar and, following the instructions, mechanically couples the second end of the power cord to an associated power source. In some embodiments, the user reads the instructions on the power cord instruction bar and then mechanically couples the second end of the power cord to an AC power source. In other embodiments, the user mechanically couples the second end of the power cord to a DC power source. In an example and referring to FIGS. 2 and 3 above, the user reads the instructions on power cord instruction bar 230 and, following the instructions, mechanically couples the second end of the power cord 221 to an AC power source.

Returning to FIG. 4, at step 430, the user reads the instructions on the networking cable instruction bar and, following the instructions, mechanically couples the second end of the networking cable to an associated data connector on an associated modem. In an example, and referring to FIGS. 2 and 3 above, the user reads the instructions on networking cable instruction bar 231 and mechanically couples the second end of networking cable 222 to an associated data connector located on an associated modem, which is not contained within enclosure 110.

Returning to FIG. 4, at step 440, the user reads the instructions on the enclosure instruction bar and, following the instructions, loads an associated CD or DVD into the user's computing device that she is attempting to place in communication with the networking system. In an example, and referring to FIG. 2 above, the user reads the instructions on enclosure instruction bar 232 and, following the instructions, loads an associated CD or DVD into the user's computing device that she is attempting to place in communication with electronic device 220 of networking system 200.

Figure 5:
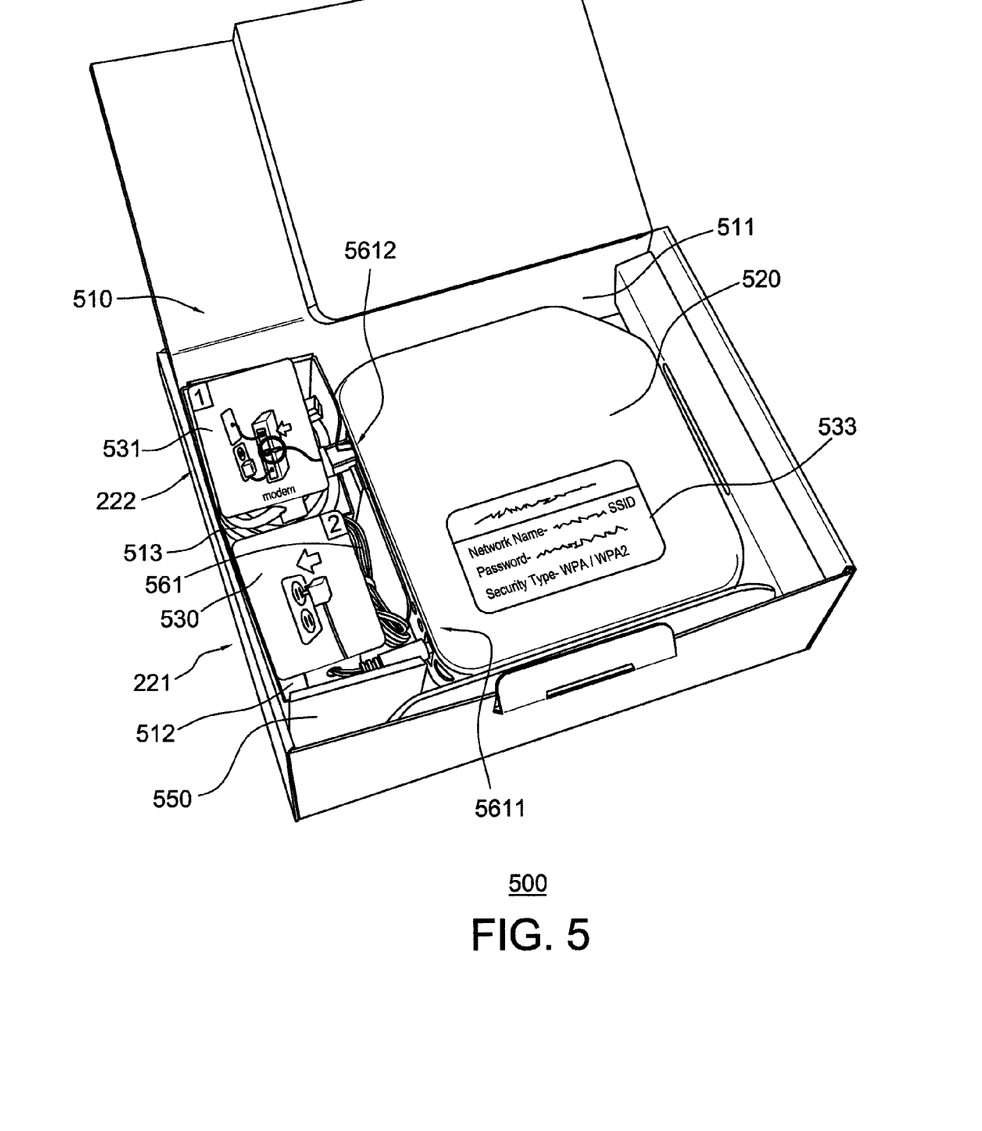
FIG. 5 illustrates an interior view of a second embodiment of an enclosure of an exemplary connection system similar to the connection system of FIG. 1.

FIG. 5 illustrates an interior view of enclosure 510 of exemplary connection system 500 for providing an enhanced user experience when physically configuring an electronic device for a network, according to an embodiment. Connection system 500 can be similar to connection system 100 (FIGS. 1-3), and enclosures 510 and 110 (FIGS. 1-3) can be similar to each other. For example, enclosure 510 comprises: (a) electronic device area 511 similar to electronic device area 211 (FIG. 2) and configured to house electronic device 220 (which can be similar to electronic device 220 in FIG. 2), (b) networking cable area 513 similar to network cable area 213 (FIG. 2) and configured to house network cable 222, (c) power cord area 512 similar to power cord area 212 (FIG. 2) and configured to house power cord 221, and (d) setup card 533 similar to setup card 233 (FIG. 2). Enclosure 510 also comprises instruction bars 530-531, which are similar to instruction bars 230-231 (FIG. 2), but comprise different respective sequence markers. Enclosure 510 differs from enclosure 210 (FIG. 2) in the present example by comprising tray 550, where tray 550 is non-integral with the rest of enclosure 510. In the present example, tray 550 comprises power cord area 512 and network cable area 513. Tray 550 also comprises wall 561, similar to wall 261 (FIG. 2) to separate electronic device area 511 from areas 512-513. In addition, wall 561 is similar to wall 261 by comprising passageways 5611 and 5612, which are similar to passageways 2611-2612 (FIG. 2). Accordingly, enclosure 510 permits power cord 221 and network cable 222 to be connected to electronic device 520 while within enclosure 510.

Figure 6:
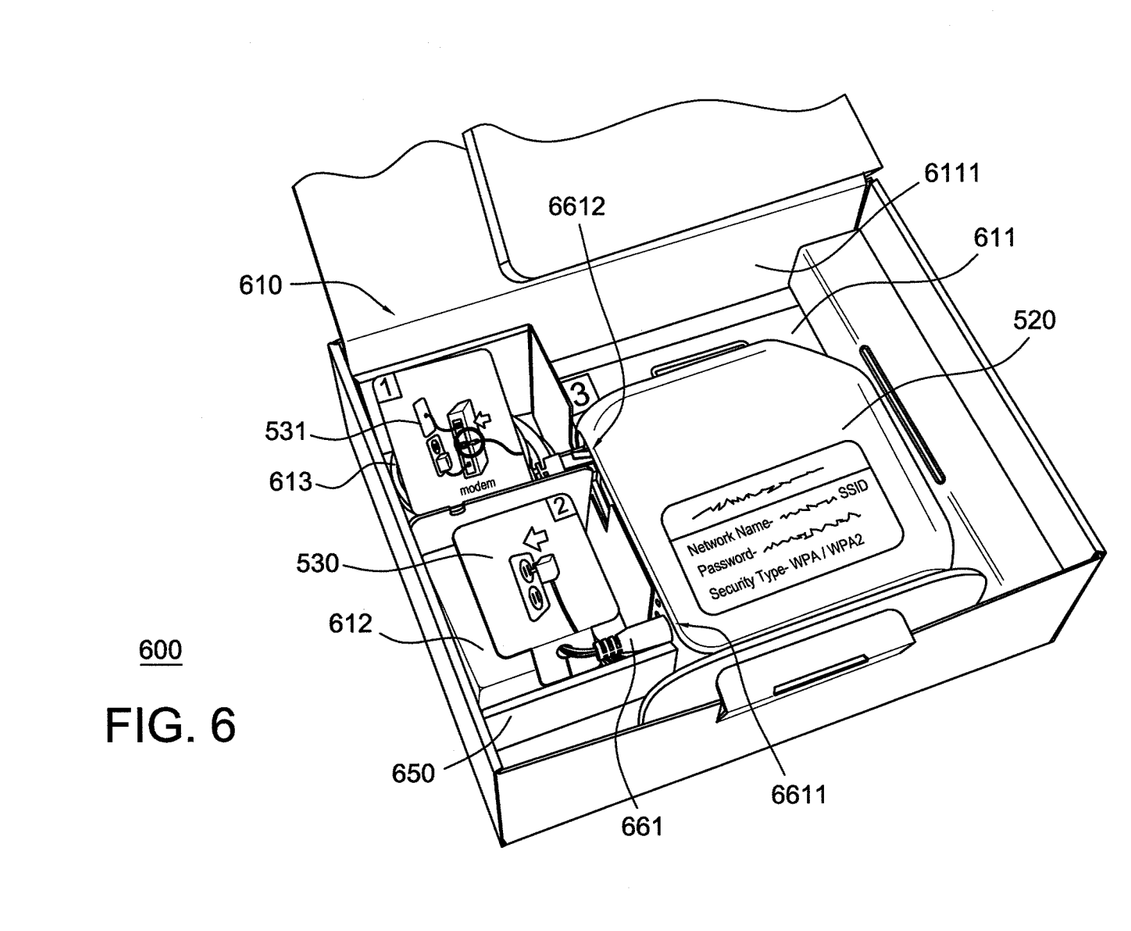
FIG. 6 illustrates an interior view of a third embodiment of an enclosure of an exemplary connection system similar to the connection system of FIG. 1.

FIG. 6 illustrates an interior view of enclosure 610 of exemplary connection system 600 for providing an enhanced user experience when physically configuring an electronic device for a network, according to an embodiment. Connection system 600 can be similar to connection system 100 (FIGS. 1-3) and to connection system 500 (FIG. 5), and enclosures 610, 110 (FIGS. 1-3), and 510 (FIG. 5) can be similar to each other. For example, enclosure 610 comprises tray 650 which is similar to tray 550 of FIG. 5. Tray 650 comprises power cord area 612, similar to power cord area 512 (FIG. 5), and network cable area 613, similar to network cable area 513 (FIG. 5). Enclosure 610 also comprises electronic device area 611, which is similar to electronic device area 511 (FIG. 5), but comprises extra area 6111 that is not occupied by electronic device 520. Electronic device area 611 can thus be used to house a different electronic device (not shown) with dimensions different than those of electronic device 520. In the present example, wall 661 of tray 650 can comprise passageways 6611-6612, similar to passageways 5611-5612 (FIG. 5), and configured to align with respective power connectors and network connectors of electronic device 520 and of the different electronic device.

Figure 7:
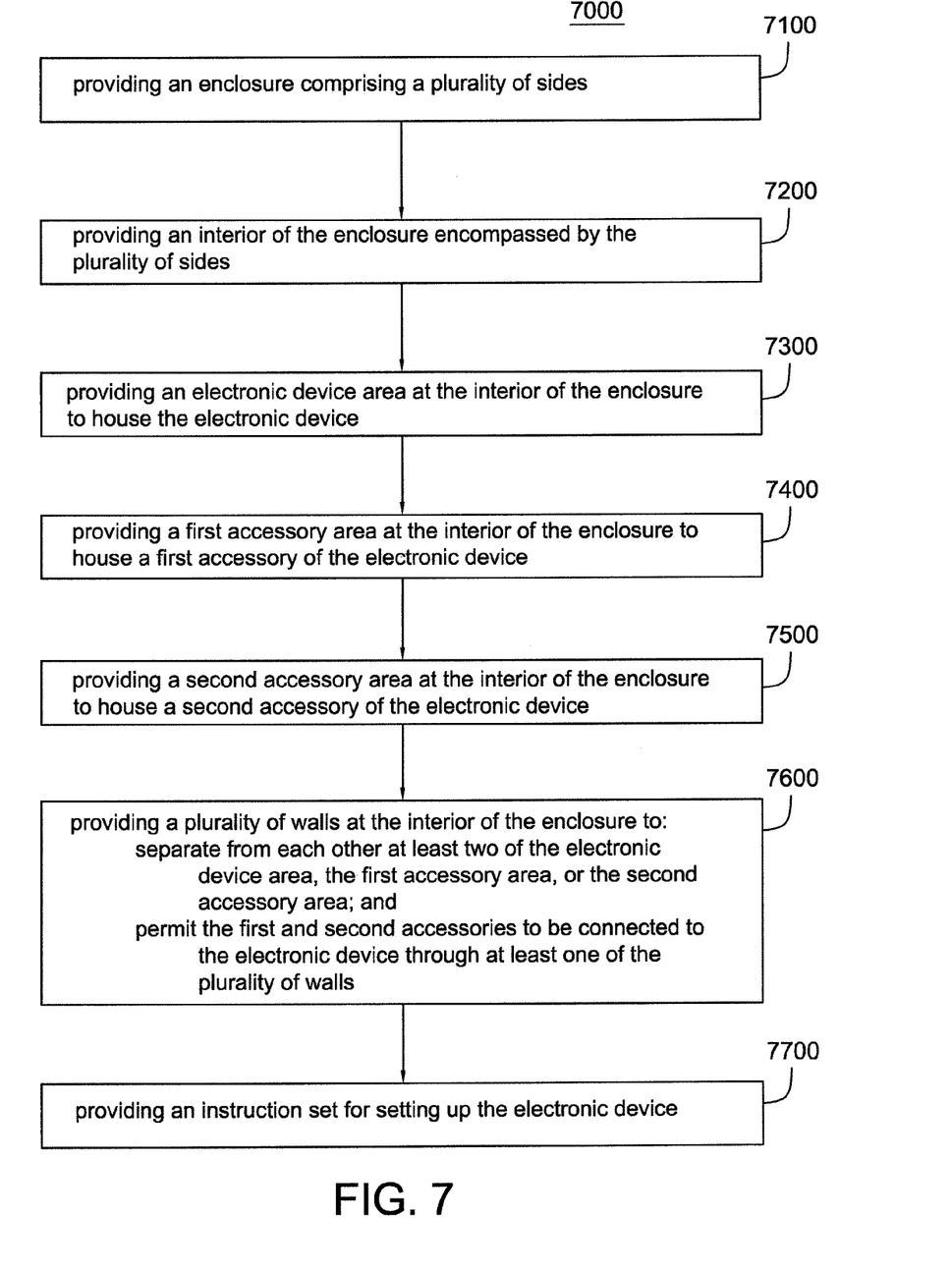
FIG. 7 illustrates a flowchart for an embodiment of a method of providing a connection system for an electronic device.

Continuing with the figures, FIG. 7 illustrates a flowchart for an embodiment of method 7000 of providing a connection system for an electronic device. In some examples, the connection system for method 7000 can be similar to one or more of connection systems 100 (FIGS. 1-3), 500 (FIG. 5), and/or 600 (FIG. 6). In the same or other examples, the electronic device of method 7000 can be similar to electronic device 220 (FIGS. 2-3), 520 (FIGS. 5-6), and/or the different electronic device described above for connection systems 100 (FIGS. 1-3), 500 (FIG. 5), and/or 600 (FIG. 6).

Block 7100 of method 7000 comprises providing an enclosure comprising a plurality of sides. In some examples, the enclosure can be similar to one or more of enclosures 110 (FIGS. 1-3), 510 (FIG. 5), and/or 610 (FIG. 6).

Block 7200 of method 7000 comprises providing an interior of the enclosure to be encompassed by the plurality of sides. In some examples, the interior of the enclosure can be similar to interior 250 (FIG. 2) and/or to the interiors of enclosures 510 (FIG. 5) and/or 610 (FIG. 6).

Block 7300 of method 7000 comprises providing an electronic device area at the interior of the enclosure to house the electronic device. In some examples, the electronic device area can be similar to one or more of electronic device areas 211 (FIG. 2), 511 (FIG. 5), and/or 611 (FIG. 6).

Block 7400 of method 7000 comprises providing a first accessory area at the interior of the enclosure to house a first accessory of the electronic device. In some examples, the first accessory area can be similar to one or more of power cord areas 212 (FIG. 2), 512 (FIG. 5), and/or 612 (FIG. 6). In other examples, the first accessory area can be similar to one or more of network cable areas 213 (FIG. 2), 513 (FIG. 5), and/or 613 (FIG. 6). There also can be examples where the first accessory area can be configured to house accessories for the electronic device that are different than power cords or network cables.

Block 7500 of method 7000 comprises providing a second accessory area at the interior of the enclosure to house a second accessory of the electronic device. In some examples, the second accessory area can be similar to one or more of power cord areas 212 (FIG. 2), 512 (FIG. 5), and/or 612 (FIG. 6). In other examples, the second accessory area can be similar to one or more of network cable areas 213 (FIG. 2), 513 (FIG. 5), and/or 613 (FIG. 6). There also can be examples where the second accessory area can be configured to house accessories for the electronic device that are different than power cords or network cables.

Block 7600 of method 7000 comprises providing a plurality of walls at the interior of the enclosure to separate from each other at least two of the electronic device area, the first accessory area, or the second accessory area, and to permit the first and second accessories to be connected to the electronic device through a least one of the plurality of walls. In some examples, the plurality of walls can be similar to walls 260 (FIG. 2), and/or can comprise walls similar to walls 261 (FIG. 2), 561 (FIG. 5), and/or 661 (FIG. 6). In the same or other examples, the walls may comprise one or more passageways, similar to one or more of passageways 2611-2612 (FIG. 2), 5611-5612 (FIG. 5), and/or 6611-6612 (FIG. 6), to permit accessories in one or more of the first or second accessory areas to be coupled to the electronic device in the electronic device area.

Block 7700 of method 7000 comprises providing an instruction set for setting up the electronic device. In some examples, the instruction set can comprise instructions similar to language neutral instructions 130-132 (FIG. 1), and/or to the language neutral instructions in instruction bars 230-232 (FIG. 2) and/or 530-531 (FIGS. 5-6). In some examples, the instruction set can comprise instruction bars coupled to specific components of the connection system, similar to instruction bars 230-232 (FIG. 2) and/or 530-531 (FIGS. 5-6). The instruction set also can comprise a setup card similar to one or more of setup cards 233 (FIG. 2), or 533 (FIG. 5). In some examples, the instruction set can comprise an external instruction bar similar to instruction bar 120 (FIG. 1). There can be also examples where the instruction set comprises a sequenced instruction set with steps meant to be carried out in a predetermined sequence. In such examples, the instructions of can comprise sequence markers similar to sequence markers 137-139 (FIG. 1) and/or 237-239 (FIG. 2).

In some examples, some of the blocks of method 7000 can be subdivided into one or more sub-blocks. For example, block 7600 can comprise a sub-block for providing a tray similar to tray 550 (FIG. 5) formed out of the plurality of walls. In the same or other examples, one or more of the different blocks of method 7000 can be combined into a single block or performed simultaneously, and/or the sequence of such blocks can be changed. For example, blocks 7300, 7400, and/or 7500 can be combined with block 7600 in cases where the tray is provided and where the tray comprises one or more of the electronic device area of block 7300, the first accessory area of block 7400, or the second accessory area of block 7500. There also can be examples where method 7000 can comprise further or different blocks. In addition, there may be examples where method 7000 can comprise only part of the blocks described above. For example, method 7000 may lack block 7700 in some examples. Furthermore, some of the blocks of method 7000 may be carried out in a different order. As an example, any of blocks 7300, 7400, and/or 7500 may be carried out before or after each other in some examples. Other variations can be implemented for method 7000 without departing from the scope of the present disclosure.

Although the networking connection systems and related methods herein have been described with reference to specific embodiments, various changes may be made without departing from the spirit or scope of the present disclosure. Examples of such options and other embodiments have been given in the foregoing description.

For example, in FIG. 2, although enclosure 110 is configured to house power cord 221 and network cable 222, there can be other embodiments where different accessories can be housed in enclosure 110 for networking device 220. Accordingly, the disclosure is intended to be illustrative of the scope of the present disclosure and is not intended to be limiting. Other permutations of the different embodiments having one or more of the features of the various figures are likewise contemplated. It is intended that the scope described herein shall be limited only to the extent required by the appended claims.

The networking connection systems and related methods discussed herein may be implemented in a variety of embodiments, and the foregoing discussion of these embodiments does not necessarily represent a complete description of all possible embodiments. Rather, the detailed description of the drawings, and the drawings themselves, disclose at least one preferred embodiment, and may disclose additional embodiments.

All elements claimed in any particular claim are essential to the networking connection systems and related methods claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefit, advantage, solution, or element is stated in such claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

The invention claimed is:

1. A connection system for an electronic device, the connection system comprising:
    an enclosure comprising:
        sides comprising: left, right, front, rear, and bottom sides; and
        an interior encompassed by the sides, the interior comprising:
            an electronic device area configured to house the electronic device;
            a first accessory area configured to house a first accessory of the electronic device;
            a second accessory area configured to house a second accessory of the electronic device; and
            one or more walls separating from each other at least two of the electronic device area, the first accessory area, or the second accessory area;

wherein:
when the electronic device is housed in the electronic device area, the first accessory is housed in the first accessory area, and the second accessory is housed in the second accessory area:
the one or more walls are configured to permit the first and second accessories to be connected to the electronic device;
the interior of the enclosure comprises a passageway between the electronic device area and the first accessory area through a first wall of the one or more walls; and
the passageway is configured to:
align with a first device connector of the electronic device, when the electronic device is housed in the electronic device area; and
permit passage of a first accessory connector of the first accessory, from the first accessory area to the electronic device area, for connection with the first device connector of the electronic device.

2. The connection system of claim 1, wherein:
the enclosure further comprises:
a top flap coupled to a top edge of at least one of the sides.

3. The connection system of claim 2, wherein:
the top flap is configured to hinge about the top edge.

4. The connection system of claim 2, further comprising:
a sequenced instruction set for setting up the electronic device; and
an instruction bar at the inner surface of the top flap;
wherein:
the instruction bar is visible alongside the interior of the enclosure when the electronic device area, the first accessory area, and the second accessory area are exposed; and
the instruction bar comprises a sequenced instruction of the sequenced instruction set.

5. The connection system of claim 1, wherein:
the electronic device area is further configured to house a second electronic device in lieu of the first electronic device; and
the passageway is configured to:
align with a connector of the second electronic device, when the second electronic device is housed in the electronic device area; and
permit passage of the first accessory connector of the first accessory, from the first accessory area to the electronic device area, for connection with the connector of the second electronic device.

6. The connection system of claim 1, wherein:
the interior of the enclosure comprises a second passageway between the electronic device area and the second accessory area through at least one of:
the first wall of the one or more walls; or
a second wall of the one or more walls;
and
the second passageway is configured to permit passage of a connector of the second accessory, from the second accessory area to the electronic device area, for connection with a second connector of the electronic device.

7. The connection system of claim 1, wherein:
at least a portion of the one or more walls delineate the electronic device area to substantially conform to a contour of a body of the electronic accessory to restrict movement of the electronic accessory when in the electronic accessory area.

8. The connection system of claim 1, wherein:
a single piece of material defines both:
the first wall of the one or more walls; and
a first side of the sides;
and
the first side is non-parallel to the first wall.

9. The connection system of claim 1, wherein:
the one or more walls define a tray locatable in the interior of the enclosure;
the tray comprises at least one of:
the electronic device area;
the first accessory area; or
the second accessory area;
and
the tray further comprises:
the passageway to permit passage to the electronic device area for connection of at least one of the first or second accessories to the electronic device.

10. The connection system of claim 1, wherein:
the first accessory comprises a power cord for the electronic device;
the second accessory comprises a network cable for the electronic device; and
the electronic device comprises a router.

11. The connection system of claim 1, wherein:
one of the one or more walls separate the electronic device area from at least one of the first accessory area or the second accessory area.

12. The connection system of claim 1, further comprising:
a first instruction bar coupled to the first accessory and comprising a first language neutral instruction.

13. The connection system of claim 12, further comprising:
a second instruction bar coupled to the second accessory;
wherein:
the first instruction bar further comprises:
a first sequence marker;
the second instruction bar comprises:
a second language neutral instruction; and
a second sequence marker;
and
the first and second sequence markers denote a sequence for performing the first and second language neutral instructions relative to each other.

14. The connection system of claim 13, wherein:
the first accessory comprises:
the first accessory connector configured to be coupled to the first device connector of electronic device; and
a second accessory connector configured to be coupled to a power source;
the second accessory comprises:
a third accessory connector configured to be coupled to a second device connector of the electronic device; and
a fourth accessory connector configured to be coupled to a network source;
the first language neutral instruction comprises an indication to couple the second accessory connector to the power source; and
the second language neutral instruction comprises an indication to couple the fourth accessory connector to the network source.

15. The connection system of claim 14, further comprising:
a third instruction bar within the interior of the enclosure;
wherein:
the third instruction bar comprises:
a third language neutral instruction; and
a third sequence marker;

and
the first, second, and third sequence markers denote a sequence for performing the first, second, and third language neutral instructions relative to each other.

16. The connection system of claim 14, further comprising:
a setup card located within the interior of the enclosure;
wherein:
the setup card comprises at least one of:
a network ID of the electronic device; or
a password for the electronic device.

17. A connection system for an electronic device, the connection system comprising:
an enclosure comprising:
sides comprising: left, right, front, rear, and bottom sides; and
an interior encompassed by the sides, the interior comprising:
an electronic device area configured to house the electronic device;
a first accessory area configured to house a first accessory of the electronic device;
a second accessory area configured to house a second accessory of the electronic device; and
one or more walls separating from each other at least two of the electronic device area, the first accessory area, or the second accessory area;
and
a first instruction bar coupled to the first accessory and comprising a first language neutral instruction;
wherein:
when the electronic device is housed in the electronic device area, the first accessory is housed in the first accessory area, and the second accessory is housed in the second accessory area:
the one or more walls are configured to permit the first and second accessories to be connected to the electronic device.

18. The connection system of claim 17, wherein:
the first instruction bar comprises a coupling mechanism to couple to the first accessory;
the coupling mechanism comprises at least one of:
an adhesive configured to couple the first instruction bar to a body of the first accessory; or
a sleeve configured to at least partially enclose a cable of the first accessory.

19. The connection system of claim 17, further comprising:
a second instruction bar coupled to the second accessory;
wherein:
the first instruction bar further comprises:
a first sequence marker;
the second instruction bar comprises:
a second language neutral instruction; and
a second sequence marker;
and
the first and second sequence markers denote a sequence for performing the first and second language neutral instructions relative to each other.

20. The connection system of claim 19, wherein:
the first accessory comprises:
the first accessory connector configured to be coupled to the first device connector of the electronic device; and
a second accessory connector configured to be coupled to a power source;
the second accessory comprises:
a third accessory connector configured to be coupled to a second device connector of the electronic device; and a fourth accessory connector configured to be coupled to a network source;
the first language neutral instruction comprises an indication to couple the second accessory connector to the power source; and
the second language neutral instruction comprises an indication to couple the fourth accessory connector to the network source.

21. The connection system of claim 20, further comprising:
a third instruction bar within the interior of the enclosure;
wherein:
the third instruction bar comprises:
a third language neutral instruction; and
a third sequence marker;
and
the first, second, and third sequence markers denote a sequence for performing the first, second, and third language neutral instructions relative to each other.

22. The connection system of claim 21, wherein:
the third language neutral instruction comprises an indication to load onto a computing device an application for configuring networking parameters with respect to the electronic device.

23. The connection system of claim 20, further comprising:
a setup card located within the interior of the enclosure;
wherein:
the setup card comprises at least one of:
a network ID of the electronic device; or
a password for the electronic device.

24. The connection system of claim 23, wherein:
the setup card is coupled to and removable from the electronic device.

25. The connection system of claim 20, further comprising:
an external instruction bar located at an exterior surface of the enclosure;
wherein:
the external instruction bar comprises:
one or more external language neutral instructions for setting up the electronic device; and
one or more external sequence markers corresponding to the one or more external language neutral instructions;
and
the one or more external language neutral instructions correspond to the first and second language neutral instructions.

26. The connection system of claim 17, wherein:
the interior of the enclosure comprises a passageway between the electronic device area and the first accessory area through a first wall of the one or more walls;
the passageway is configured to:
align with a connector of the electronic device, when the electronic device is housed in the electronic device area; and
permit passage of a connector of the first accessory, from the first accessory area to the electronic device area, for connection with the connector of the electronic device;
the interior of the enclosure comprises a second passageway between the electronic device area and the second accessory area through at least one of:
the first wall of the one or more walls; or
a second wall of the one or more walls;
and
the second passageway is configured to permit passage of a connector of the second accessory, from the second accessory area to the electronic device area, for connection with a second connector of the electronic device.

27. A method for providing a connection system for an electronic device, the method comprising:
   providing an enclosure comprising sides;
   providing an interior of the enclosure encompassed by the sides;
   providing an electronic device area at the interior of the enclosure to house the electronic device;
   providing a first accessory area at the interior of the enclosure to house a first accessory of the electronic device;
   providing a second accessory area at the interior of the enclosure to house a second accessory of the electronic device; and
   providing walls at the interior of the enclosure to:
      separate from each other at least two of the electronic device area, the first accessory area, or the second accessory area; and
      permit the first and second accessories to be connected to the electronic device through at least one of the walls;
   wherein:
      providing the walls comprises:
         providing a first passageway at a first wall of the walls, between the first accessory area and the electronic device area, the first passageway being configured to:
            align with a first connector of the electronic device, when the electronic device is housed in the electronic device area and
            permit of a connector of the first accessory, from the first accessory area to the electronic device area, for connection with the first connector of the electronic device;
         providing a second passageway between the electronic device area and the second accessory area through at least one of:
            the first wall of the walls; or
            a second wall of the walls;
         and
         configuring the second passageway to permit passage of a connector of the second accessory, from the second accessory area to the electronic device area, for connection with a second connector of the electronic device.

28. The method of claim 27, wherein:
   providing the enclosure comprises:
      providing a top flap coupled to a top edge of at least one of the sides.

29. The method of claim 27, wherein:
   providing the electronic device area comprises:
      providing the electronic device area to house either the first electronic device or a second electronic device;
   and
   providing the first passageway comprises:
      configuring the first passageway to:
         align with a connector of the second electronic device, when the second electronic device is housed in the electronic device area; and
         permit passage of the connector of the first accessory, from the first accessory area to the electronic device area, for connection with the connector of the second electronic device.

30. The method of claim 27, further comprising:
   providing a tray locatable in the interior of the enclosure and defined by at least some of the walls, the tray comprising:
      at least one of:
         the electronic device area;
         the first accessory area; or
         the second accessory area;
      and
      the first passageway to permit passage to the electronic device area for connection of at least one of the first or second accessories to the electronic device.

31. The method of claim 27, further comprising:
   providing a first instruction bar coupled to the first accessory and comprising a first language neutral instruction.

32. The method of claim 31, further comprising:
   providing a first sequence marker at the first instruction bar; and
   at least one of:
      providing a second instruction bar coupled to the second accessory and comprising:
         a second language neutral instruction; and
         a second sequence marker denoting a sequence to perform the second language neutral instruction relative to at least the first sequence marker;
      providing a third instruction bar within the interior of the enclosure and comprising:
         a third language neutral instruction; and
         a third sequence marker denoting a sequence to perform the third language neutral instruction relative to at least the first sequence marker;
      providing a setup card located within the interior of the enclosure and comprising at least one of:
         a network ID of the electronic device; or a password for the electronic device or
      providing an external instruction bar located at an exterior surface of the enclosure and comprising:
         one or more external language neutral instructions for setting up the electronic device and corresponding to at least one of the first, second, or third language neutral instructions;
   wherein:
      providing the first instruction bar comprises:
         providing the first language neutral instruction to comprise an indication to couple the connector of the first accessory to one of a power source or a network source;
      providing the second instruction bar comprises:
         providing the second language neutral instruction to comprise an indication to couple the connector of the second accessory to a different one of the power source or the network source;
      and
      providing the third instruction bar comprises:
         providing the third language neutral instruction to comprise an indication to load, onto a computing device, an application for configuring networking parameters with respect to the electronic device.

33. The method of claim 27, wherein:
   providing the walls at the interior of the enclosure further comprises:
      providing the walls to separate the electronic device area from at least one of the first accessory area or the second accessory area.

* * * * *